(12) United States Patent
Yan et al.

(10) Patent No.: US 8,711,986 B2
(45) Date of Patent: Apr. 29, 2014

(54) ADVANCED JOINT DETECTION IN A TD-SCDMA SYSTEM

(75) Inventors: Aiguo Yan, Andover, MA (US);
Yonggang Hao, Waltham, MA (US);
Marko Kocic, Arlington, MA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 311 days.

(21) Appl. No.: 13/235,462

(22) Filed: Sep. 18, 2011

(65) Prior Publication Data
US 2013/0070833 A1   Mar. 21, 2013

(51) Int. Cl.
*H04L 27/06*   (2006.01)
*H04B 1/10*   (2006.01)

(52) U.S. Cl.
USPC .......................................... 375/340; 375/350

(58) Field of Classification Search
CPC ...... H03K 5/00; H04L 27/06; H04B 1/71052; H04B 2201/70718
USPC .................................................. 375/340, 350
See application file for complete search history.

(56) References Cited

U.S. PATENT DOCUMENTS

| | | | |
|---|---|---|---|
| 2004/0086055 A1* | 5/2004 | Li ................................... | 375/260 |
| 2005/0152486 A1* | 7/2005 | Wang ............................. | 375/350 |
| 2009/0147895 A1* | 6/2009 | McKown ....................... | 375/354 |
| 2012/0269202 A1* | 10/2012 | Hao et al. ...................... | 370/479 |

* cited by examiner

*Primary Examiner* — Don N Vo
(74) *Attorney, Agent, or Firm* — Winston Hsu; Scott Margo

(57) ABSTRACT

A communication system is provided that includes a composite transfer module that receives an input signal and performs one or more selective operations defined by a first transfer function on the input signal. The composite transfer module outputs a first signal. A joint detection module receives the first signal and performs joint detection on the first signal. The joint detection module utilizes channel estimation information of the first transfer function so as to allow the joint detection module to perform joint detection with an oversampling rate of 2× or higher.

16 Claims, 5 Drawing Sheets

ADVANCED JOINT DETECTION IN A TD-SCDMA SYSTEM

BACKGROUND

The invention is related to the field of joint detection in a receiver, and in particular to using a joint detection technique that allows more then 16 coded channels to be jointly detected.

Mathematically, 1× Joint Detection based receiver can only detect up to 16 TD-SCDMA code channels. TDSCDMA systems uses universal frequency reuse plan, i.e., neighboring cells could immediately reuse the RF carrier frequencies which are used in the serving cell. Due to this reason, a UE could receive a signal which is a composite of more than 16 code channels each of which has significant (and non-negligible) power level. In order to further improve receiver performance (in terms of BLER or throughput), it is desirable to jointly detect more than 16 code channels. The invention proposes to jointly detect more than 16 code channels for the purpose of further mitigating interference.

SUMMARY

According to one aspect of the invention, there is provided a communication system. The communication system includes a composite transfer module that receives an input signal and performs one or more selective operations defined by a first transfer function on the input signal. The composite transfer module outputs a first signal. A joint detection module receives the first signal and performs joint detection on the first signal. The joint detection module utilizes channel estimation information of the first transfer function so as to allow the joint detection module to perform joint detection with an oversampling rate of 2× or higher.

According to another aspect of the invention, there is provided a method of performing joint detection in a communication system. The method includes receiving an input signal and performing one or more selective operations defined by a first transfer function on the input signal and outputting a first signal using a composite transfer function. Also, the method includes receiving the first signal and performs joint detection on the first signal using a joint detection module. The joint detection module utilizes channel estimation information of the first transfer function so as to allow the joint detection module to perform joint detection with an oversampling rate of 2× or higher.

These and other objectives of the present invention will no doubt become obvious to those of ordinary skill in the art after reading the following detailed description of the preferred embodiment that is illustrated in the various figures and drawings.

DETAILED DESCRIPTION

The invention proposes a novel technique allowing for more then 16 coded channels to be jointly detected. Using the inventive technique, one can mitigate interference and increase throughput of a receiver.

Figure 1:
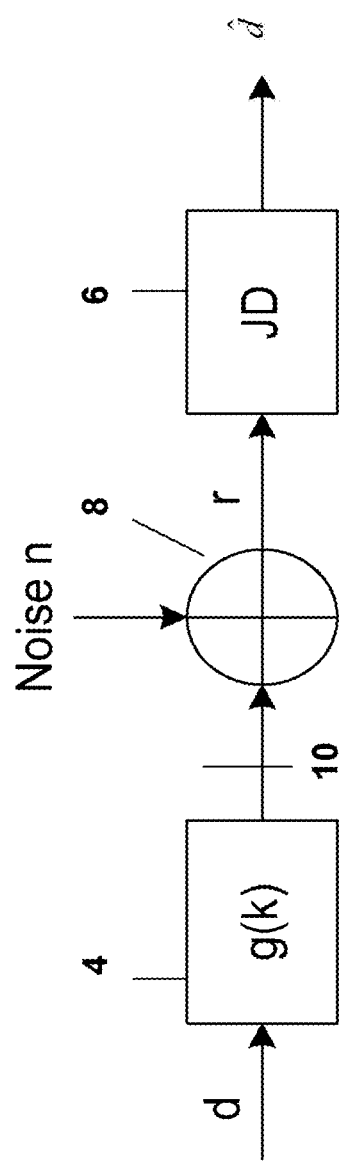
FIG. 1 is a schematic diagram illustrating a general overview of the invention.

FIG. 1 shows a general overview of the JD receiver. The communication system 2 includes an input signal d that is provided to a Transmission (TX) function module 4 comprising a transfer function g(k). The TX module 4 performs its corresponding processing of the input signal d and outputs a signal 10. The signal 10 is provided as input to an addition module 8. The addition module 8 also receives as input a noise signal n. The noise signal n corresponds to noise associated with the communication system 2. The addition module 8 performs an addition operation on the signal 10 and noise n and outputs a signal r. The signal r is provided as input to a joint detection module 6. The joint detection module uses the signal r to perform data symbol estimation of the input signal d, and outputs an approximated output signal $\hat{d}$.

The digital-front end module 4 corresponds to a unified transfer function that defines the transmission filters, channel impulse filters, and receiver filters used in the communication system 2. The following mathematical relations define the communication system 2:

$$r = Td + n \qquad \text{Eq. 1}$$

$$\hat{d} = (T^H R_n^{-1} T + R_d^{-1})^{-1} T^H R_n^{-1} r \qquad \text{Eq. 2}$$

$$R_n = E[nn^H] \text{ and } R_d = E[dd^H] \qquad \text{Eq. 3}$$

If one assumes $R_n = \sigma^2 I$ and $R_d = I$, then $\hat{d} = (T^H T + \sigma^2 I)^{-1} T^H r$. The invention allows the joint detection (JD) module 6 to perform joint detection at the 2× oversampling rate. Note the matrix T is calculated by the JD module 6.

Figure 2:
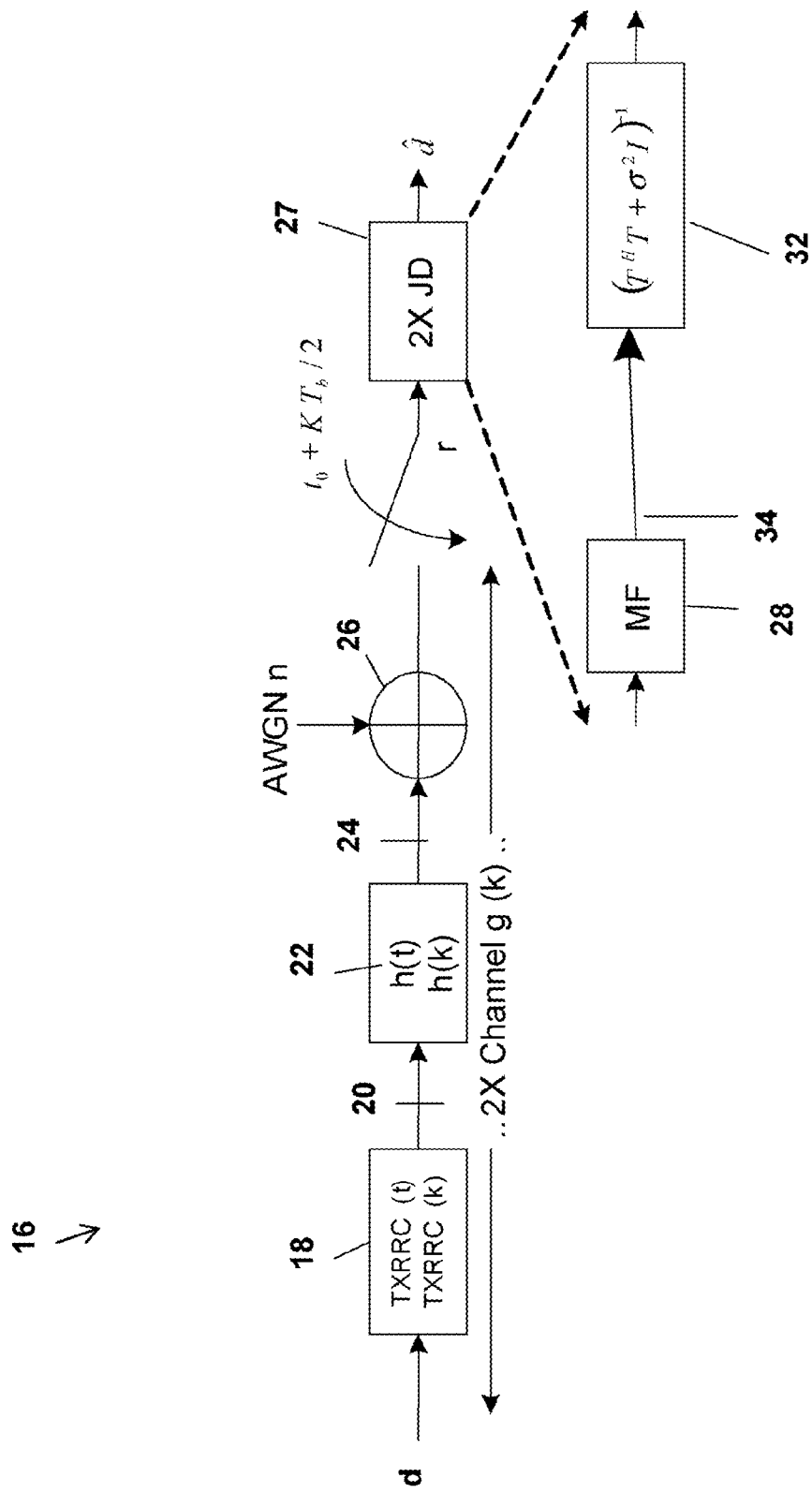
FIG. 2 is a schematic diagram illustrating a detailed arrangement of the invention.

FIG. 2 is a schematic diagram illustrating a detailed arrangement of the invention. A communication system 16 includes a transmit root-raised cosine (TXRRC) filter module 18, having a transfer function TXRRC(k), that receives as input a data signal d. The TXRRC filter module 18 performs a root-raised cosine (RRC) filter operation on the data signal d and outputs a signal 20. The signal 20 is provided as input to a channel impulse filter 22. The channel impulse filter module 22 filters the signal 20 in the communication system 16 using the transfer function h(k). An addition module 26 receives as input the output signal 24 of the channel impulse filter module 22 and an additive white Gaussian noise (AWGN) n, which is a noise signal associated with the communication system 16. The addition module 26 performs addition on the output signal 24 and the AWGN signal n and provides as output the signal r. A JD module 27 receives as input the signal r. The signal r is defined in Eq. 1 above. The JD module 27 performs its operation with a 2× oversampling rate. In this case, the JD module 27 must calibrate power and other essential factors in performing joint detection at a 2× oversampling rate.

The JD module 27 includes a match filter module 28 that receives as input the signal r. The match filter module 28 performing its respective match filtering operations on the signal r and outputs a signal 34. A symbol rate block equalizer 32 receives as input the signal 34 and performs its respective operation to produce the output signal $\hat{d}$. Both the signal r and output signal $\hat{d}$ are defined in Eq. 1 and 2. The symbol rate block equalizer 32 is defined as follows:

$$(T^H T + \sigma^2 I)^{-1} \qquad \text{Eq. 4}$$

where the JD module 27 performs selective operations in determining the matrix T, using possibly a channel estimation of the composite transfer function g(k) or other considerations. In this case, the composite transfer function g(k) defines a unified transfer function defining the property of the transfer functions TXRRC(k) and h(k) with an oversampling rate of 2×.

Figure 3:
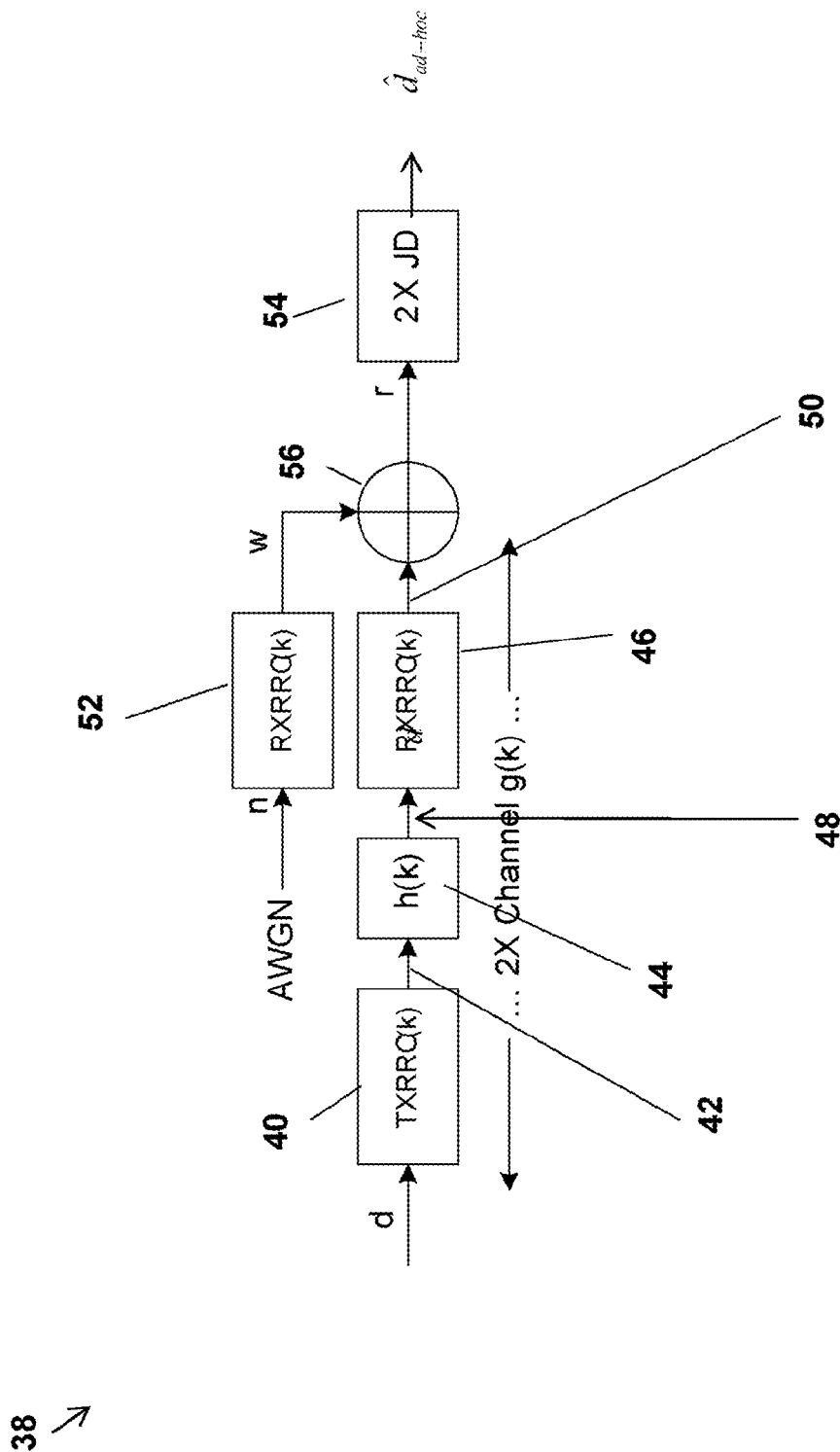
FIG. 3 is a schematic diagram illustrating an ad-hoc arrangement useful in implementing the invention.

The invention provides three 2×JD implementations. The first one is illustrated by FIG. 3. It is a schematic diagram illustrating an ad-hoc arrangement 38 useful in implementing the invention. The communication system 38 includes a TXRRC filter module 40, having transfer function TXRRC (k), that receives as input a data signal d and performs a root-raised cosine filtering on the data signal d and outputs a signal 42. A channel impulse filter 44, having a transfer h(k), receives as input the signal 42 and performs its respective channel impulse filtering operation and outputs a signal 48. A first receiver RRC (RXRRC) filter module 46 receives as input the signal 48 and performs a RRC function on the signal 48 and outputs a signal 50. A second RXRRC filter module 52 receives as input an AWGN signal n as input and performs a RRC function on the AWGN signal n and outputs a signal w. The first and second RXRRC filter modules 46, 52 each having a transfer function defined as RXRRC(k) and operating at 2× oversampling rate. An addition module 56 receives as input the signal 50 and the signal w and performs an addition operation. The addition module 56 outputs a signal r that is received by a JD module 54 performing joint detection at an oversampling rate of 2×. The composite transfer function g(k) defines a unified transfer function illustrating the overall properties of the transfer functions TXRRC(k), h(k), and the transfer functions RXRRC(k). The following relations define the output signal r and output signal $\hat{d}$ $$r = Td + w \qquad \text{Eq. 5}$$

$$\hat{d}_{MMSE-BLE} = (T^H R_w^{-1} T + R_d^{-1})^{-1} T^H R_w^{-1} r \qquad \text{Eq. 6}$$

Notice r, T and w are associated with 2× oversampling rate, and T is a function of g(k) in this implementation.

In general, $R_w = (l_w L_w^H)$ and $(L_w^H)^{-1}$ is the block-noise-whitening operation when the inverse matrix does exist. However, one can easily verify that $R_w$ from the FIG. 3 is not invertible.

It is known that $R_n = \sigma^2 I$ and $R_w \neq \sigma^2 I$. However, one can choose to (forcefully and incorrectly) assume $R_w = \sigma^2 I$. Then $\hat{d}_{ad-hoc} = (T^H T + \sigma^2 I)^{-1} T^H r$ together with the normal assumption of $R_d = I$. Since an incorrect assumption for $R_w$ is made, the performance for a $\hat{d}_{ad-hoc}$ is not going to be the best. The ac-hoc or heuristic or intuitive thinking suggests that one can have $\hat{d}_{ad-hoc} = (T^H T + \alpha \sigma^2 I)^{-1} T^H r$ and try to vary $\alpha$ to achieve a better performance. Of course, the best performance with a linear solution is dictated by FIG. 2. Using the 2× ad-hoc-BLE $\hat{d}_{ad-hoc} = (T^H T + \alpha \sigma^2 I)^{-1} T^H r$ to approximate the true MMSE-BLE receiver is like using a pre-defined type of function to curve-fit another function.

Figure 4:
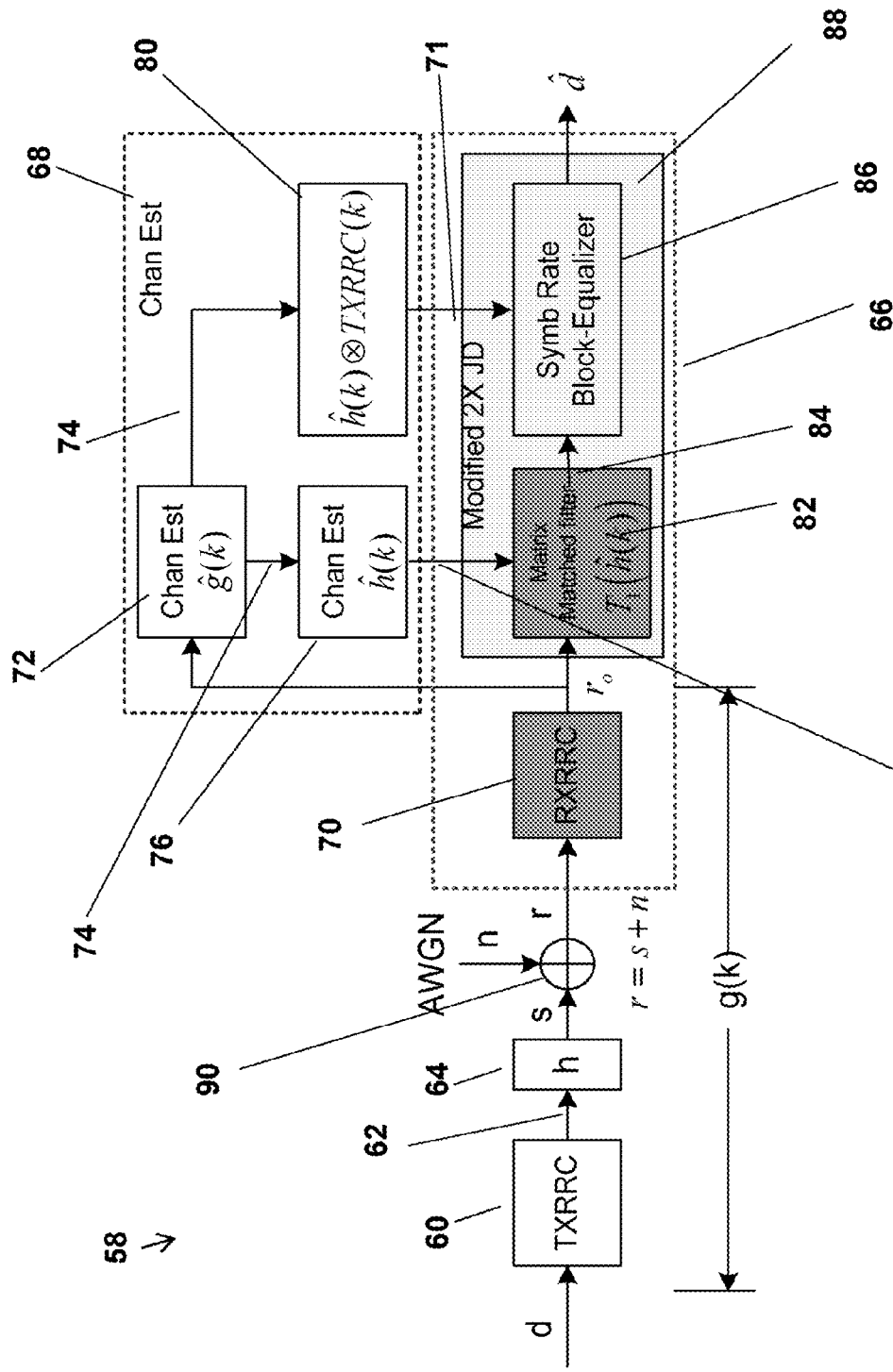
FIG. 4 is a schematic diagram illustrating a communication system formed in accordance with invention where a receiver root-raised cosine (RXRRC) filter is positioned in the digital front-end.

FIG. 4 is a schematic diagram illustrating the 2$^{nd}$ implementation of 2×JD. The communication system 58 formed in accordance with invention where a RXRRC filter 70 is positioned in the digital front-end. The communication system 58 includes a TXRRC filter module 60 that receives as input data signal d. The TXRRC filter module 60 performs a RRC operation on the data signal d and outputs a signal 62. The TXRRC filter module 60 includes a transfer function TXRRC(k). A channel impulse filter, having a transfer function h(k), receives the signal 62 as input and performs its respective operation and outputs a signal s. An addition module 90 receives as input the signal s and an AWGN signal n and performs addition on these signals. The addition module 90 outputs a signal r, where r=s+n. A RXRRC filter module 70, having a transfer function RXRRC(k), receives as input the signal r and produces as output the signal r0, (removed since s0 is not literately defined). A JD module 66 receives as input the signal r0. The digital front-end transfer function g(k) defined a unified transfer function associated with transfer functions in the digital front-end, such as the transfer functions TXRRC(k), h(k), and RXRRC(k)

The JD module 66 includes a modified 2× JD module 88 and a symbol rate block-equalizer 86. The 2× JD module 88 includes a matrix matched filter $T_1$ module 82 that is a function of the channel estimation function $\hat{h}(k)$ associated with the channel impulse filter module 64 applying to the signal r0. The channel estimated computation module 82 outputs a signal 84. The symbol rate block-equalizer 86 receives as input the signal 84 and performs its respective operation to produce an output signal $\hat{d}$. The symbol rate block-equalizer 86 uses the following relations:

$$(T_2^H T_2 + \sigma_n^2 I)^{-1} = (T_2^H T_2 + \alpha \sigma_w^2 I)^{-1} = (T_2^H T_2 + 2 \sigma_w^2 I)^{-1} \qquad \text{Eq. 7}$$

where the $T_2$ matrix is a function of $\hat{h}(k) \otimes$ TXRRC(k) and needed to compute the output signal $\hat{d}$.

A channel estimation module 68 receives as input the signal r0. The channel estimation module 68 includes a channel estimation $\hat{g}(k)$ module 72 receiving as input the signal r0 and performs channel estimation of the composite transfer function g(k) that is outputted as signal 74. A channel estimation $\hat{h}(k)$ module 76 receives the signal 74 and performs channel estimation of the channel impulse filter transfer function h(k) that is outputted as signal 78. A $T_2$ matrix transfer function module 80 receives as input the signal 74 and compute the T matrix using the impulse response $\hat{h}(k) \otimes$ TXRRC(k) that is outputted as signal 71.

The channel matrix matched filter module 82 receives as input the signal 74 for processing the signal with a function of $\hat{h}(k)$. Also, the symbol rate block-equalizer receives as input the signal 71 having elements of the T matrix for computation of the output signal $\hat{d}$.

The signal r0 includes 2× oversampling samples to be used in channel estimation and JD that passed through the RXRRC filter module 70 which has its impulse response as the RRC pulse. Noise power is estimated using w which is band-limited. A properly scaled noise power should be used in the symbol rate block equalizer. Also, $\hat{h}(n)$ is the 2× equivalence of h(n). In general, one can have $\hat{h}(k) \neq h(k)$ and $\hat{h}(k) \otimes$ TXRRC(k) $\approx$ h(k) $\otimes$ TXRRC(k).

Figure 5:
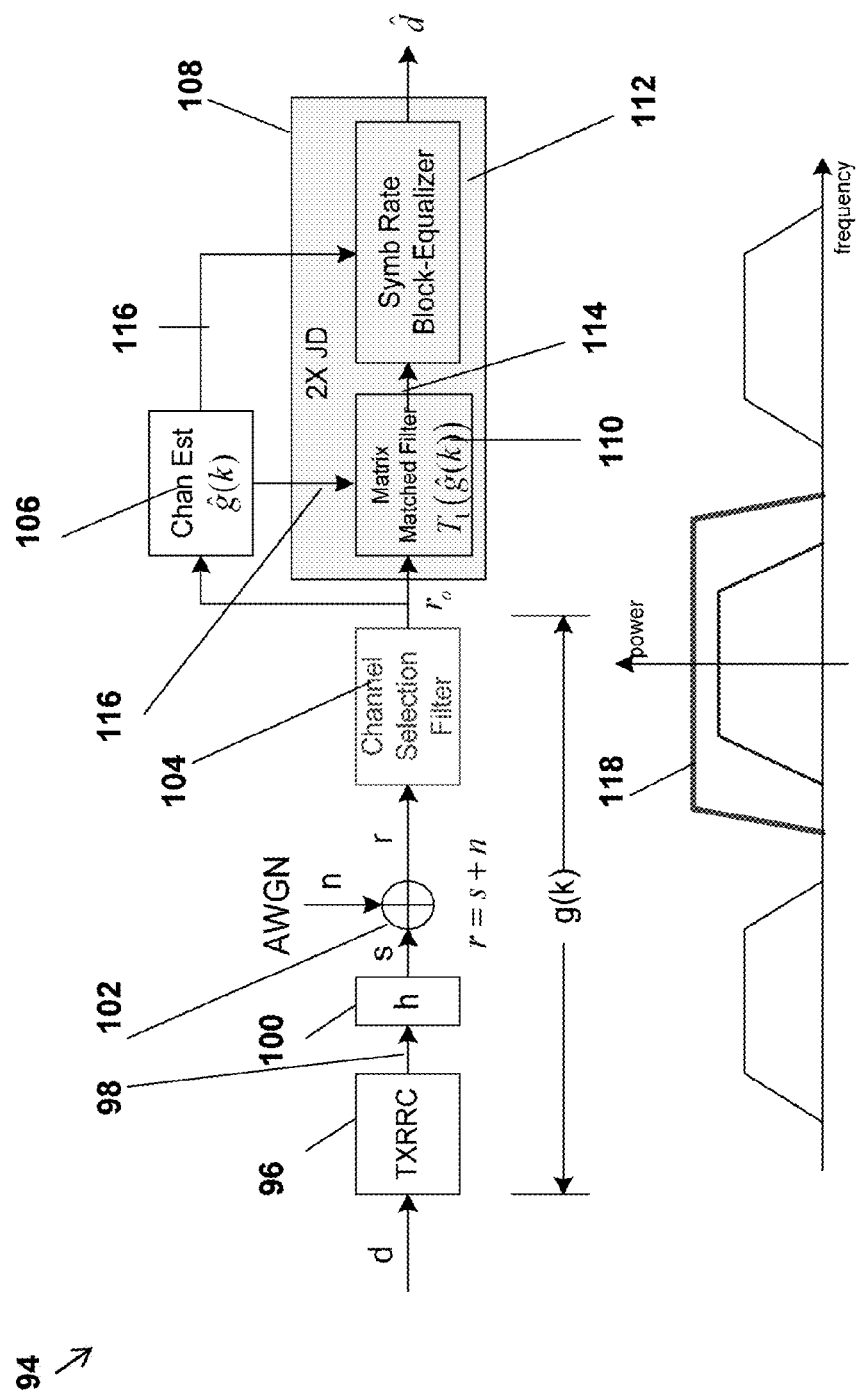
FIG. 5 is a schematic diagram illustrating a communication system formed in accordance with invention where a RXRRC filter is not positioned in the digital front-end.

FIG. 5 is a schematic diagram illustrating the 3$^{rd}$ way of 2×JD implementation. A communication system 94 is formed in accordance with invention where a RXRRC filter is not positioned in the digital front-end. The communication system 94 includes a TXRRC filter module 96 that receives as input data signal d. The TXRRC filter module 96 performs a RRC operation on the data signal d and outputs a signal 98. The TXRRC filter module 96 includes a transfer function TXRRC(k). A channel impulse filter 100, having a transfer function h(k), receives the signal 98 as input and performs its respective operation and outputs a signal s. An addition module 102 receives as input the signal s and an AWGN signal n and performs addition on these signals. The addition module 102 outputs a signal r, where r=s+n. A channel selection filter module 104 receives as input the signal r and produces as output the signal r0. The channel selection filter module 104 selects a range 118 of frequency to produce the output r0. A 2× JD module 108 receives as input the signal r0 having a oversampling rate of 2×. The RXRRC filter is no longer part of the digital front end. As long as the channel selection filter 104 does not cut off useful signal bandwidth, it should have no impact to JD performance. The composite transfer function g(k) defined a unified transfer function associated with transfer functions in the signal path, such as the transfer functions TXRRC(k), h(k), and the transfer function of the channel selection filter 104.

The 2×JD module 108 includes a matrix matched filter module 110 that performs matched filtering with a function of ĝ(k) using the signal r0. The matrix matched filter module 110 outputs a signal 114. The symbol rate block-equalizer 112 receives as input the signal 114 and performs its respective operation to produce an output signal d̂. The symbol rate block-equalizer 112 uses the following relations:

$$(T^H T+\sigma_n^2 I)^{-1}=(T^H T+\alpha\sigma_w^2 I)^{-1} \quad \text{Eq. 7}$$

where the T matrix is needed to compute the output signal d̂ and the noise scaling factor, $\alpha$, depends on the channel selection filter.

A channel estimation ĝ(k) module 106 receives as input the signal r0 and performs channel estimation of the composite transfer function g(k) that is outputted as signal 116. The matrix matched filter module 110 receives as input the signal 116. Also, the symbol rate block-equalizer 112 receives as input the signal 116 that aid in determining the elements of the T matrix for computation of the output signal d̂.

The invention improves receiver performance (in terms of BLER or throughput), by jointly detecting more than 16 code channels. The invention jointly detects more than 16 code channels for the purpose of further mitigating interference. The invention can be applied to TD-SCDMA systems to allow increase performance without undue burden.

Although the present invention has been shown and described with respect to several preferred embodiments thereof, various changes, omissions and additions to the form and detail thereof, may be made therein, without departing from the spirit and scope of the invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication system comprising:
   a composite transfer module that receives an input signal and performs one or more selective operations based on a first transfer function of the input signal, the composite transfer module outputs a first signal; and
   a joint detection module that receives the first signal and performs joint detection on the first signal, the joint detection module utilizes channel estimation information of the first transfer function so as to allow the joint detection module to perform joint detection with an oversampling rate, wherein sampling frequency of the oversampling rate is at least equal to or higher than twice a frequency of a signal being sampled;
   wherein the joint detection module is configured to perform joint detection on more than 16 coded channels.

2. The communication system of claim 1, wherein the composite transfer module comprises a transmission root-raise cosine (RRC) filter module and a channel impulse filter module.

3. The communication system of claim 2, wherein the composite transfer module comprises an addition module that performs addition on the output signal from the channel impulse filter module and an additive white Gaussian noise signal, the addition module outputs a second signal.

4. The communication system of claim 2, wherein the composite transfer module comprises a receiver RRC filter module.

5. The communication system of claim 1, wherein the composite transfer module utilizes the channel estimation of the first transfer function to compute the channel estimation of the transfer function of a channel impulse filter module used in the digital front-end module.

6. The communication system of claim 5, wherein the joint detection module utilizes the channel estimation of the first transfer function to compute the T matrix used in symbol rate block equalization.

7. The communication system of claim 1, wherein the composite comprises a channel selection filter module for selecting a selective range of frequencies to perform joint detection.

8. The communication system of claim 1, wherein the composite transfer module mitigates interference when coding more than 16 code channels.

9. A method of performing joint detection in a communication system, the method comprising:
   receiving an input signal;
   performing one or more selective operations defined by a first transfer function on the input signal and outputting a first signal using a composite transfer function; and
   receiving the first signal and performs joint detection on the first signal using a joint detection module, the joint detection module utilizes channel estimation information of the first transfer function so as to allow the joint detection module to perform joint detection with an oversampling rate, wherein sampling frequency of the oversampling rate is at least equal to or higher than twice a frequency of a signal being sampled;
   wherein the joint detection module is configured to perform joint detection on more than 16 coded channels.

10. The method of claim 9, wherein the composite transfer module comprises a transmission root-raise cosine (RRC) filter module and a channel impulse filter module.

11. The method of claim 9, wherein the composite transfer module comprises an addition module that performs addition on the output signal from the channel impulse filter module and an additive white Gaussian noise signal, the addition module outputs a second signal.

12. The method of claim 9, wherein the composite transfer module comprises a receiver RRC filter module.

13. The method of claim 9, wherein the composite transfer module utilizes the channel estimation of the first transfer function to compute the channel estimation of the transfer function of a channel impulse filter module used in the digital front-end module.

14. The method of claim 13, wherein the joint detection module utilizes the channel estimation of the first transfer function to compute the T matrix used in symbol rate block equalization.

15. The method of claim 9, wherein the composite comprises a channel selection filter module for selecting a selective range of frequencies to perform joint detection.

16. The method of claim 9, wherein the composite transfer module mitigates interference when coding 16 or more code channels.

* * * * *